United States Patent
LaMothe et al.

(10) Patent No.: US 8,144,028 B2
(45) Date of Patent: Mar. 27, 2012

(54) METHOD AND SYSTEM OF OBTAINING DATA FROM FIELD DEVICES

(75) Inventors: Brian P. LaMothe, Conrad, IA (US); Richard J. Vanderah, Marshalltown, IA (US); David S. Willett, Conrad, IA (US); Damon J. Ellender, Tomball, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 1345 days.

(21) Appl. No.: 11/041,346

(22) Filed: Jan. 24, 2005

(65) Prior Publication Data

US 2006/0168396 A1     Jul. 27, 2006

(51) Int. Cl.
    *G08C 19/22*           (2006.01)
(52) U.S. Cl. ...................... 340/870.07; 702/56; 702/183; 714/25; 714/26; 714/46; 714/47
(58) Field of Classification Search ............. 340/870.07; 702/56, 183; 714/25, 26, 46, 47
See application file for complete search history.

(56) References Cited

U.S. PATENT DOCUMENTS

| | | | | |
|---|---|---|---|---|
| 5,553,094 A | * | 9/1996 | Johnson et al. | ............... 375/130 |
| 5,845,230 A | * | 12/1998 | Lamberson | ..................... 702/56 |
| 6,490,493 B1 | | 12/2002 | Dharnipragada | |
| 6,499,114 B1 | * | 12/2002 | Almstead et al. | ............... 714/25 |
| 2006/0184288 A1 | * | 8/2006 | Rodgers | ........................ 700/295 |

* cited by examiner

*Primary Examiner* — Timothy Edwards, Jr.
(74) *Attorney, Agent, or Firm* — Mark E. Scott; Conley Rose, P.C.

(57) ABSTRACT

Systems and methods for communicating data from field devices to data acquisition systems. In at least some exemplary embodiments, a remote process or field controller may obtain data, and send the data to a data cache only if the data has changed from previously sent data. The data acquisition system may poll the data cache for data. Having the remote process controller send only data that has changed allows the communication channel between the data caching system and the remote process controller to have a bandwidth or throughput lower than what may be needed to support the polling of the data acquisition system.

34 Claims, 3 Drawing Sheets

METHOD AND SYSTEM OF OBTAINING DATA FROM FIELD DEVICES

BACKGROUND OF THE INVENTION

1. Field of the Invention

Various embodiments of the invention are directed to distributed process control systems. More particularly, various embodiments are directed to distributed systems requiring reduced bandwidth between at least data acquisition systems and remote equipment.

2. Background of the Invention

A growing trend in process control is distributed process control. Rather than having a single, centralized control center sending control commands to remote locations, the control functionality is moved closer to the controlled equipment. The centralized control center then may take a more supervisory role in the process control. For example, rather than sending a continuous stream of valve position commands to a valve controlling flow, the centralized control center may send a single flow set point to a remote process controller proximate to the valve, and allow the remote process controller to make valve position adjustments to achieve and maintain the desired flow.

Regardless of the location of the control functionality, the centralized control center may need a continuous or periodic stream of data from the remote locations for supervisory purposes. For example, if the remote operation is a hydrocarbon production well, the centralized control center may need to know the instantaneous flow rate of natural gas produced, the BTU content of the natural gas produced, and/or the instantaneous flow rate of oil produced. For these reasons, the centralized control center in distributed process control systems may be referred to as a supervisory control and data acquisition (SCADA) system.

SCADA systems may need data in as close to real time as possible. Thus, SCADA systems couple to the remote process controllers at the remote locations and continuously poll those controllers for data FIG. 1 illustrates a related art system in which a SCADA system 10 couples to a remote process controller 12 through a high bandwidth communication channel 14. The high bandwidth communication channel may take many forms, such as an Ethernet network, DSL or ADSL, single wire, radio based, satellite based communication, or a combination of one or more of these. Regardless of the physical structure of the high bandwidth communication channel, for proper operation the communication channel 14 should have sufficient bandwidth to support the continuous polling of the remote controller 12 by the SCADA system 10. Providing sufficient bandwidth, especially to remote locations, can be a recurring and major expense.

Thus, what is needed in the art is a mechanism to reduce the bandwidth requirements between SCADA systems and remote operations.

SUMMARY OF SOME OF THE PREFERRED EMBODIMENTS

The problems noted above are solved in large part by a method and related system of obtaining data from field devices. Some of the exemplary embodiments may be a method comprising obtaining data regarding a field parameter from a field device by a field controller, sending the data from the field controller to a data cache only if the data is different by a predetermined amount than previous data sent to the data cache, and operating a data acquisition system. The data acquisition system polls the data cache at a polling frequency to obtain the data from the data cache.

Other exemplary embodiments may be a data caching device comprising a first communication port implementing a first communication protocol, a second communication port coupled to the first communication port (the second communication port implementing a second communication protocol), a third communication port coupled to the first communication port (the third communication port implementing a third communication protocol, and wherein the third communication protocol is different than the first communication protocol). The data caching device receives unsolicited data across the second and third communication ports and caches the data, and wherein the data caching device receives requests for the data across the first communication port and provides cached data to the first communication port upon substantially each request received.

Other exemplary embodiments may be a system comprising a data acquisition system, a data cache coupled to the data acquisition system (wherein the data acquisition system polls the data cache for data regarding a plurality of field parameters), a field device that creates a datum, and a field controller coupled to the field device in the data cache. The field controller obtains the datum from the field device, and the field controller sends the datum to the data cache only if the datum is different than a previous datum sent to the data cache.

Yet still other exemplary embodiments may be a system comprising a plurality of field devices measuring field parameters to create measurement data, a supervisory control and data acquisition (SCADA) system coupled to the plurality of field devices (wherein the SCADA system obtains the measurement data using a request and response format requiring above a predetermined bandwidth), and a communication network coupling the plurality of field devices to the SCADA system. A portion of the communication network has a bandwidth less than the predetermined bandwidth.

Yet other exemplary embodiments may be a system comprising a plurality of field devices measuring field parameters to create measurement data, a data acquisition system (wherein the data acquisition system obtains the measurement data using a request and response format), a first caching system coupled to the field devices (the first caching system caches measurement data), and a second caching system coupled between the first caching system and the data acquisition system (wherein the second caching system caches measurement data provided by the first caching system and further provides the measurement data to the data acquisition system upon request).

Yet still other exemplary embodiments may be a field controller comprising a processor, a random access memory coupled to the processor, a first communication port coupled to the processor (the first communication port communicates to field measurement devices using a first communication protocol), and a second communication port coupled to the processor (the second communication port communicates to a data cache system using a second communication protocol). The processor, executing a program, performs a process control loop and sends commands to the field control devices. Also the processor, executing a program, receives data from the field devices over the first communication port, caches the data in the random access memory, and sends the data to the data cache if the data has changed from previous data sent to the data cache.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect electrical connection via other devices and connections.

DETAILED DESCRIPTION OF THE PREFERRED EMBODIMENTS

Figure 2:
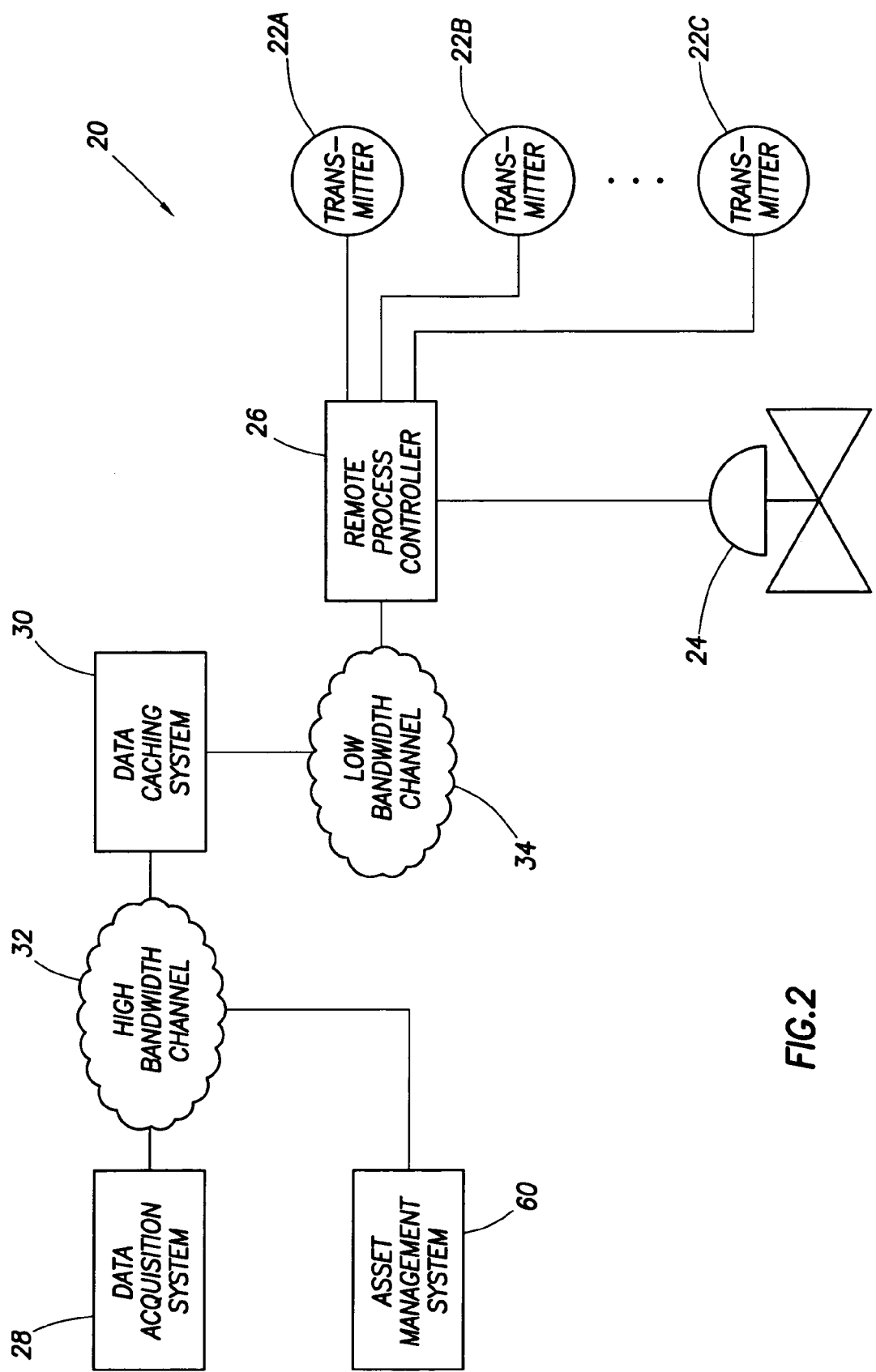
FIG. 2 illustrates a system constructed in accordance with at least some embodiments of the invention.

FIG. 2 illustrates a system 20 constructed in accordance with at least some embodiments of the invention. In particular, FIG. 2 shows a plurality of field devices, in this illustrative case being transmitters 22 and control valve 24. The transmitters 22 could be, for example, pressure transmitters, flow transmitters and/or temperature transmitters which measure their respective field parameters and provide that measurement data to the field controller or remote process controller 26. Based at least in part on the data received from the transmitters 22, the remote process controller 26 may control field devices, such as by providing valve position commands to the illustrative control valve 24. A system comprising one or more transmitters 22 and control valve 24 is merely exemplary. Remote process controllers 26 in accordance with embodiments of the invention may couple to any number of field measurement devices and field control devices, and further may be programmed to execute many process control loops based on measurement data.

Still referring to FIG. 2, system 20 further comprises a data acquisition system 28 coupled to the remote process controller 26. The data acquisition system 28 may take many forms, e.g., a supervising control and data acquisition (SCADA) system and/or a centralized historical database in an otherwise distributed control system. Regardless of the precise form of the data acquisition system 28, these systems obtain measurement data by polling, at a polling frequency, downstream devices for the measurement data. Stated otherwise, the data acquisition system 28 may obtain data in a request/response manner. Data acquisition systems 28 poll for data as fast as the data acquisition system 28 hardware will allow, and this operational characteristic thus requires a high bandwidth connection between the data acquisition system 28 and the downstream device or devices which provide the measurement data upon request.

The remote process controller 26, and field devices such as transmitters 22 and control valves 24 may be located tens, hundreds or thousands of miles from the physical location of the data acquisition system 28. To establish high bandwidth connection between the data acquisition system 28 and the remote process controller 26 may not be possible, or may be prohibitively expensive. To address this difficulty, and in accordance with embodiments of the invention, the data acquisition system 28 couples to the remote process controller 26 through a data caching system 30 which, as will be discussed more fully below, allows the communication network between the data acquisition system 28 and the remote process controller 26 to include a low bandwidth channel that is otherwise insufficient to handle the polling for measurement data of the data acquisition system 28.

Still referring to FIG. 2, the data acquisition system 28 couples to the data caching system 30 by way of a high bandwidth channel 32. The high bandwidth channel 32 may take many forms, but in accordance with at least some embodiments of the invention, the high bandwidth channel 32 may be an Ethernet network supporting 10 megabits per second data throughput or greater. The data caching system 30 may couple to the remote process controller 26 by way of a low bandwidth communication channel 34. Inasmuch as the remote process controller 26 may be located proximate to the field operations and may be many miles from the physical location of the data acquisition system 28, the low bandwidth connection may be any available communication channel to inexpensively span the distance, such as a dial-up or leased phone line connection, cellular phone, GSM, or GPRS, radio/ or a satellite communication system, or a combination of two or more of these. The low bandwidth communication channel 34 may have a data throughput of 256 kilo-bits per second or less in most systems. A description of measurement data transfer from the field devices to the data acquisition system 28, in spite of the presence of a low bandwidth channel 34, will now be discussed starting with the field devices and working to the data acquisition system 28.

Still referring to FIG. 2, the field devices, such as transmitters 22, may measure field parameters to create measurement data. The remote process controller 26 may obtain the measurement data from the field devices. In accordance with at least some embodiments of the invention, the exemplary transmitters 22 may couple to the remote process controller 26 by way of 4-to-20 mA current loops, wherein the direct electrical current drawn by each transmitter 22 is directly proportional to the measured field parameter. In accordance with alternative embodiments of the invention, the transmitters 22 may be highway addressable remote transducer (HART) compatible, and thus in addition to or in place of a value indicated by the 4-to-20 mA signal, the transmitters may digitally communicate their measurement data to the remote process controller over the 4-to-20 mA current loop. Use of a 4-to-20 mA current loop and/or HART digital communications over a 4-to-20 mA current loop are merely exemplary of the communication protocols that may be used between the remote process controller 26 and field devices such as transmitters 22. Any currently existing, or after developed, communication protocol may be used in the communications between the remote processor controller 26 and the field devices, such as Foundation FieldBus and/or the MOD- BUS protocols. In some embodiments, the remote process controller 26 may poll the field devices for measurement data. In alternative embodiments, the field devices may not wait for a request for data from the remote process controller 26, and instead may send unsolicited measurement data to the remote process controller at any convenient time. Regardless of the precise mechanism by which the remote process controller obtains the measurement data from the field devices, the remote process controller caches the measurement data, and forwards copies of the measurement data to the data caching system 30 only if the measurement data has changed from previous measurement data sent to the data caching system 30.

Figure 1:
FIG. 1 illustrates a related art SCADA system.
Figure 3:
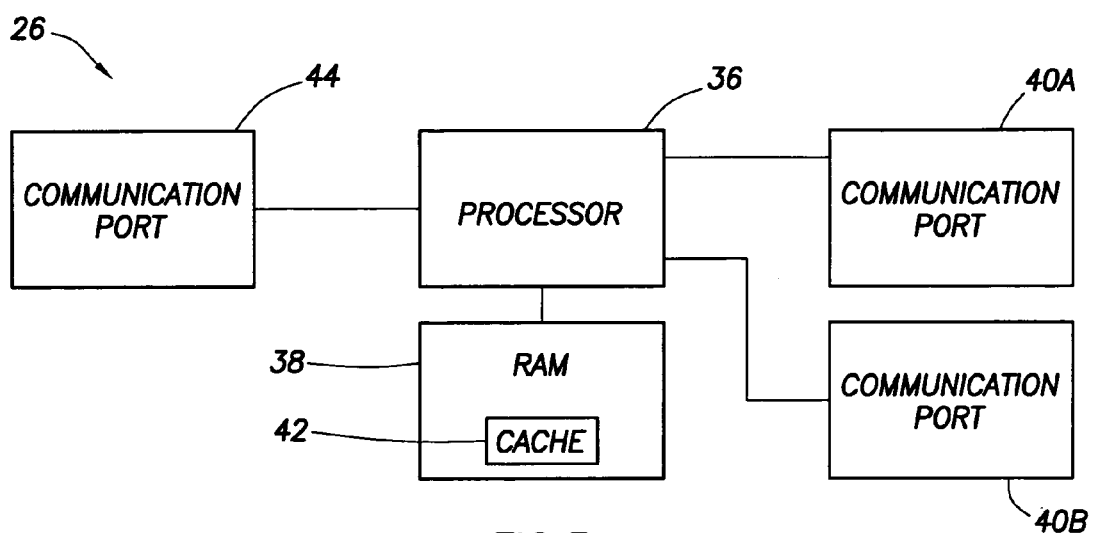
FIG. 3 illustrates a remote process controller in accordance with at least some embodiments of the invention.

FIG. 3 shows in greater detail a remote process controller 26 in accordance with embodiments of the invention. In particular, the remote process controller may comprise a processor 36 coupled to random access memory (RAM) 38. The processor 36 may take many forms. In some embodiments, the processor may be a microcontroller, and thus the RAM 38 functionality, along with other components such as read only memory (ROM) and communications capabilities, may be integrated on a single semiconductor die. In alternative embodiments, the processor 36 may be a standalone processor (e.g., a processor manufactured by Intel® Freescale/Motorola and/or AMD), and thus may be coupled to other individual components, such as the RAM 38. Moreover, processor 36 may be an application specific integrated circuit (ASIC), a field programmable gate array (FPGA), and/or system on a chip. Regardless of the precise nature of the processor 36, the processor may be programmed to, or may execute software programs to, perform desired functions, such as control of process control loops.

The processor 36 may couple to and communicate with the field devices by way of one or more communication ports 40. The precise nature of the communication ports 40 may depend on the type of field devices to which the remote process controller 26 couples. For example, if the field device is an exemplary transmitter 22 which communicates by way of a 4-to-20 mA current loop, at least one of the communication ports 40 may be a current source and analog-to-digital converter which allows the processor 36 to obtain a reading of the current drawn by the field device. In alternative embodiments, the field devices may be HART compliant, and thus may be capable of digital communication. In these alternative embodiments, one or more of the communication ports 40 may be a MODEC device in combination with other circuitry which may allow extraction of the digital communication from the 4-to-20 mA current loop, and likewise may allow integration of communications originating from the remote process controller 26 to be embedded on the 4-to-20 mA current loop. In yet further alternative embodiments, one or more of the communication ports 40 may be circuitry necessary to implement other communication protocols, such as Foundation FieldBus and/or the MODBUS protocol.

Upon receiving measurement data from field devices the remote process controller 26, and in particular a program executed on the processor 36, may store the measurement data in a cache 42, which in some embodiments may reside within a portion of the RAM 38.

Still referring to FIG. 3, the remote process controller 26 may further comprise yet another communication port 44 coupled to the processor 36. Communication port 44 may allow the processor 36 to communicate with upstream devices, such as the data caching system 30 (of FIG. 2). In some embodiments, communication port 44 may have the capability of sending and receiving data communications through a low bandwidth channel being a wireless communication channel. In these embodiments, the communication port 44 may have the ability to control a radio communication set. In alternative embodiments, the low bandwidth channel may be a dial-up telephone system. In these embodiments, the communication port 44 may be a modem capable of dial-up connection control.

Figure 4:
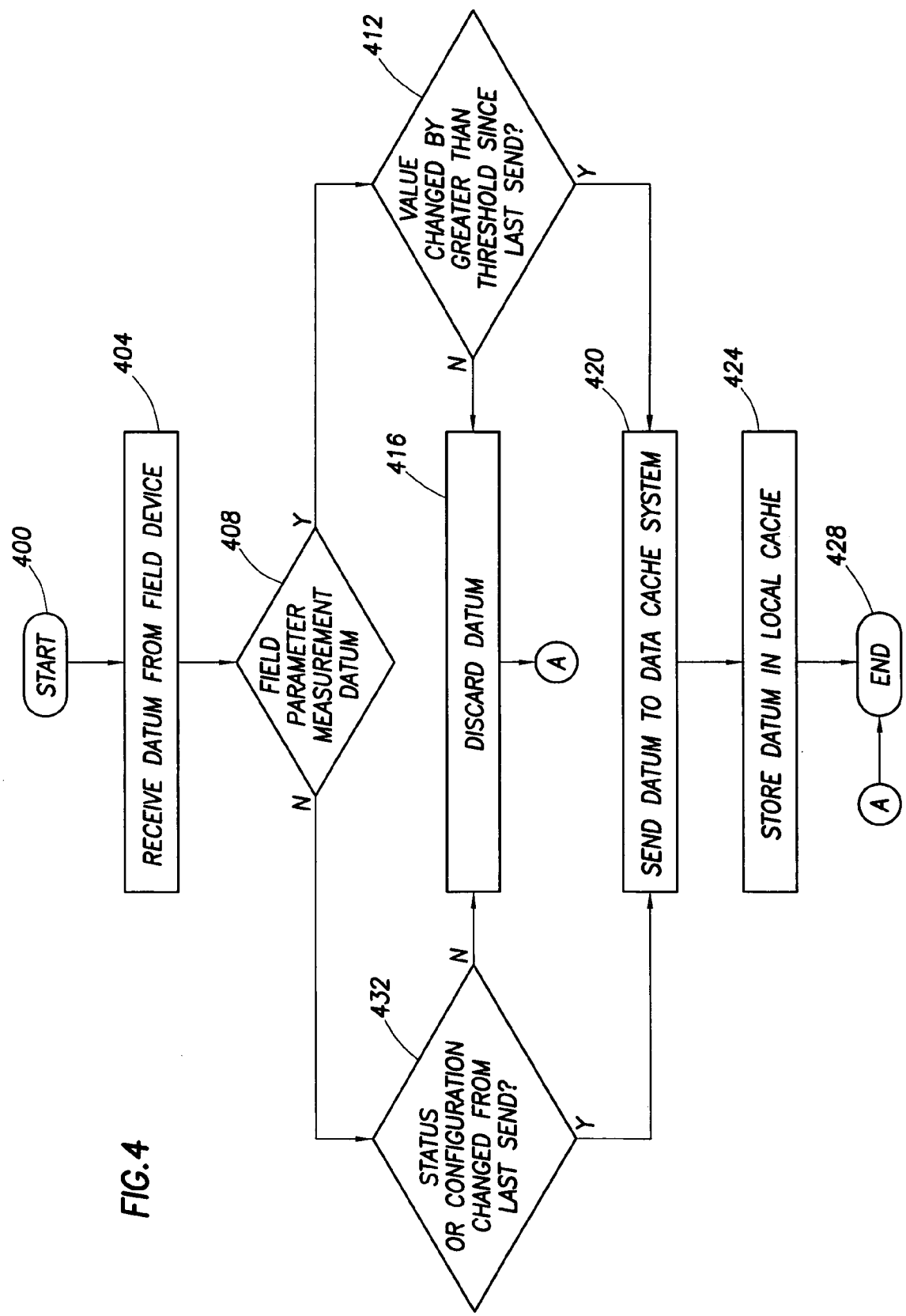
FIG. 4 illustrates a method that may be implemented by a remote processor in accordance with at least some embodiments of the invention.

FIG. 4 illustrates a method that may be implemented by a remote process controller 26 in accordance with at least some embodiments of the invention. The method illustrated by FIG. 4 may be implemented as a software program executed by the processor 36. In alternative embodiments, the method illustrated by FIG. 4 may be implemented in hardware, such as in an application specific integrated circuit (ASIC). In particular, the process may start (block 400) and move to the remote process controller 26 receiving a datum from the field device (block 404). Receipt of the datum from the field device may be based on a poll or request by the remote process controller 26, or the field device may send unsolicited data, such as HART burst traffic. The next step in the process may be a determination of whether the datum is a field parameter measurement datum (block 408). Inasmuch as the field devices such as the transmitters 22 and control valve 24 may be "smart" devices, the datum received may be either a value representing a measured field parameter, or the datum may be status and/or configuration data of the field device itself. If the datum is a field parameter measurement datum, the next step in the process may be determining whether the value of the field parameter represented by the datum has changed by at least a predetermined threshold or amount since the last send of information from the remote process controller 26 to the data caching system 30 (block 412). For example, if the particular datum represents a pressure measurement for a slow moving field parameter, there may have been little, if any, change in the measured pressure since the last send of the pressure information to the data caching system 30. If the change in the pressure is less than the predetermined threshold, then the exemplary datum is discarded (block 416) and the process ends (block 428). If, on the other hand, the datum represents a change in the measured value greater than the predetermined threshold, the next step in the process may be to send the datum to the data caching system (block 420). Thereafter, the remote process controller 26 may store the datum in the local cache 42 (block 424) and the process ends (block 428). The portion of the illustrative flow diagram of FIG. 4 regarding status and configuration of the data will be discussed more thoroughly below.

Attention is now turned to the data caching system 30 of FIG. 2. In accordance with at least some embodiments of the invention, the data caching system 30 performs three functions: the data caching system caches data provided by the remote process controller 26; provides cached data to the data acquisition system 28 upon request; and as will be discussed more thoroughly below, the data caching system 30 may provide protocol translation as between the high bandwidth channel 32 and one or more low bandwidth channels 34. The remote process controller 26 sends data to the data caching system 30 only if the data is different by a predetermined threshold than previous data sent by the remote process controller 26. The data caching system 30 caches each datum received from the remote process controller, and provides the data to the data acquisition system upon request.

Figure 5:
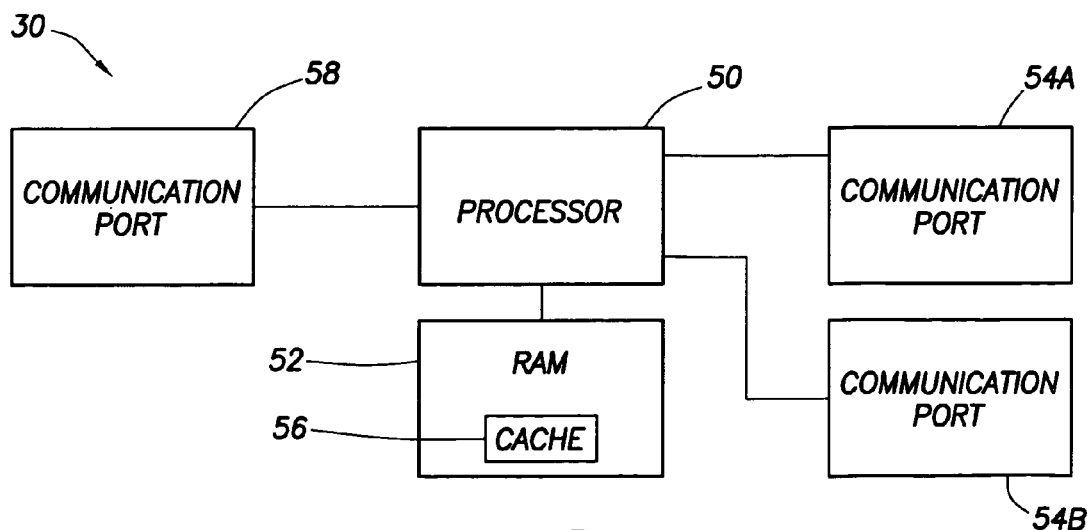
FIG. 5 illustrates a data caching system in accordance with at least some embodiments of the invention.

FIG. 5 shows in greater detail a data caching system 30 in accordance with embodiments of the invention. In particular, the data caching system 30 may comprise a processor 50 coupled to a RAM 52. The processor 50 may be a standalone microprocessor, or the processor and RAM functionality may be provided by a microcontroller. The data caching system 30 couples to one or more remote process controllers 26 (FIG. 2) by way of communication ports 54. The communication ports may take any suitable form, such as devices for interfacing and communicating through radio transmissions, or modems for establishing dial-up connections. As discussed with respect to FIGS. 3 and 4, downstream remote process controllers (not shown in FIG. 5) may send unsolicited data to the data caching system through communication ports 54. Processor 50, executing a program, may receive the data and store the data in a cache 56 within the random access memory 52.

The data caching system 30 may further comprise a communication port 58 that implements a communication protocol for communication with upstream devices, such as the data acquisition system 28 (of FIG. 2). Based on polls or requests from the data acquisition system 28, the processor 50, executing a program, may receive the requests and provide the requested data from the data cache 56.

Summarizing before continuing, field parameters may be measured to create data which is obtained by the remote process controller 26. The remote process controller 26 analyzes the data to determine if it is different by a predetermined threshold than previous data sent to the data cache. If the data has changed, the remote process controller 26 sends the data to the data caching system 30. The data caching system 30, in turn, stores the data, and upon request from the data acquisition system 28 provides the data to the data acquisition system. Thus, while the data acquisition system 28 believes it is receiving a continuous stream of data from the field devices, and utilizing a high bandwidth communication channel to obtain the data, in actuality at least some of the data provided to the data acquisition system comes from the cache within the data caching system 30. By not sending each and every datum generated by the field devices, it is possible to utilize a low bandwidth communication channel between the data caching system 30 and the remote process controller 26. The bandwidth or throughput of the communication channel between the data caching system 30 and the remote process controller 26 may be less than a bandwidth needed for the data acquisition system to poll at its polling frequency. Thus, a system such as illustrated in FIG. 2 may be implemented without the necessity of establishing and maintaining a high bandwidth connection between the data acquisition system and the remote process controller 26.

Referring again to FIG. 2, a process control system 20 may also have an asset management system 60 in addition to, or in place of, the data acquisition system 28. An asset management system may be a computer system, implementing a program, that gathers and maintains status and configuration data regarding a process control system, including status and configuration data from field devices such as transmitters 22. Status data may comprise information such as transmitter health, internal diagnostics, input voltage, current input, current output, communications health, and configuration changes. Configuration data may comprise information such as serial numbers, calibration dates, calibration parameters tuning parameters, generic text messages, instrument materials constructions, instrument sensor ranges, instrument input signal ranges, instrument output signal ranges, and alarm setpoints. This information may be helpful in troubleshooting failures of a process control system and/or implementing preventative maintenance programs.

In order to gather the status and configuration data, the asset management system 60 may couple to the field devices, through the data caching system 30 and remote process controller 26. Communications between the asset management system and the field devices may take at least two forms. In some embodiments, the asset management system 60 communicates directly with field devices to request and receive information. In these embodiments, the data caching system 30 and the remote process controller 26, in addition to the functionality described above with respect to measurement data, may act as message routers directing the request to the appropriate field device, and likewise returning the requested information from the field device back to the asset management system. Consider, for purposes of explanation only, that the asset management system desires to obtain status and/or configuration data regarding transmitter 22A. In such a circumstance, the asset management system may generate a message that is sent to the data caching system 30. The data caching system 30, recognizing the request as originating from an asset management system and not the data acquisition system 28, may forward the request to the appropriate remote process controller 26 (keeping in mind that each data caching system 30 may couple to multiple remote process controllers and therefore multiple field devices). The remote process controller, receiving the forwarded request, may examine the message and in turn forward the request to the appropriate field device, in the exemplary case transmitter 22A. Transmitter 22A, upon receiving the request, may provide the requested information by originating a message whose ultimate destination is the asset management system 60. However, because the transmitter 22A couples to the remote process controller 26, the message is initially sent to the remote process controller 26. Recognizing that the message is destined for upstream devices, the remote process controller 26 may then forward the message across the low bandwidth communication channel 34 to the data caching system 30. Likewise, the data caching system, recognizing that the message is not measurement data, may forward the response to the asset management system 60.

In this context then, it is seen that in addition to the data caching capabilities of the data caching system 30, that the data caching system 30 also acts as a message router and a protocol translator, translating protocols between the high bandwidth channel 32 and the low bandwidth channel 34. Likewise, the remote process controller, in addition to obtaining measurement data and sending that measurement data to the data caching system 30 only if data is different by a predetermined amount, the remote process controller also acts as a message router and protocol translator, in this case between the protocol of the low bandwidth channel 34 and the communication protocol required to communicate to the field devices, such as transmitters 22.

In alternative embodiments of the invention with respect to the status and configuration data of the field devices, this status and configuration data too may be polled and/or otherwise obtained by the remote process controller, and cached by the data caching system. Returning again briefly to FIG. 4, at some point in the exemplary process a determination is made as to whether the datum received is a field parameter measurement datum (block 408). If not, then the remote process controller 26 makes a determination as to whether the status or configuration data represented in the received datum has changed from the last send (block 432). If there has been no change, the datum is discarded (block 416) and the process ends (block 428). If, on the other hand, the status and configuration data represents a change from the previous status and configuration data held by the remote process controller 26, then the new status and/or configuration data is sent to the data caching system (block 420). Much like measurement data from field devices, the data caching system 30 in accordance with these embodiments, caches the status and/or configuration data. Upon a request for the status and/or configuration data from the asset management system 60, the data caching system 30 merely provides the requested information from its internal cache 56. In this way, this information is provided without burdening the low bandwidth channel 34.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    obtaining data regarding a field parameter from a field device by a field controller;
    sending the data from the field controller to a data cache only if the data is different by a predetermined amount than previous data sent to the data cache;
    sending the data from the field controller to the data cache by way of a first communication channel, and wherein the bandwidth of the first communication channel is less than a bandwidth needed for the data acquisition system to poll at the polling frequency; and
    operating a data acquisition system, wherein the data acquisition system polls the data cache at a polling frequency to obtain the data from the data cache.

2. The method as defined in claim 1 further comprising sending the data to the data cache across the first communication channel having a bandwidth of less than 256 megabits per second.

3. The method as defined in claim 1 wherein obtaining further comprises polling the field device by the field controller.

4. The method as defined in claim 1 further comprising:
    reading asset management data of the field device by the field controller; and
    sending the asset management data to the data cache only if the data has changed from previous asset management data sent to the data cache.

5. The method as defined in claim 4 further comprising reading asset management data being one or both of field device status data and field device configuration data.

6. A method comprising:
    obtaining data regarding a field parameter from a field device by a field controller;
    sending the data from the field controller to a data cache only if the data is different by a predetermined amount than previous data sent to the data cache;
    operating a data acquisition system, wherein the data acquisition system polls the data cache at a polling frequency to obtain the data from the data cache;
    reading asset management data of the field device by the field controller; and
    sending the asset management data to the data cache only if the data has changed from previous asset management data sent to the data cache;
    sending the data regarding the field parameter and the asset management data to the data cache by way of a first communication channel, wherein the bandwidth of the first communication channel is less than a bandwidth needed for the data acquisition system to poll at the polling frequency.

7. A data caching device comprising:
    a first communication port configured to implement a first communication protocol;
    a second communication port coupled to the first communication port, the second communication port configured to implement a second communication protocol;
    a third communication port coupled to the first communication port, the third communication port configured to implement a third communication protocol, and wherein the third communication protocol is different than the first communication protocol;
    wherein the data caching device is configured to receive unsolicited data across the second and third communication ports and caches the data, and wherein the data caching device is configured to receive requests for the data across the first communication port and is configured to provide cached data to the first communication port upon substantially each request received.

8. The data caching device as defined in claim 7 wherein the second communication protocol is different than the first communication protocol.

9. The data caching device as defined in claim 7 wherein the data throughput of the first communication port is greater than the combined data throughput of the second and third communication ports.

10. The data caching device as defined in claim 9 wherein the data caching device is configured to receive requests at a request rate that requires a first data throughput, and wherein the combined data throughput of the second and third communication ports is less than the first data throughput.

11. A system comprising:
    a data acquisition system;
    a data cache coupled to the data acquisition system, wherein the data acquisition system is configured to poll the data cache for data regarding a plurality of field parameters;
    a first communication pathway coupling the data acquisition system and the data cache, the first communication pathway having a bandwidth sufficient to carry the data acquisition system polls for data regarding the plurality of field parameters;
    a field device configured to create a datum;
    a field controller, remotely located from the data acquisition system, coupled to the field device and the data cache, wherein the field controller is configured to obtain the datum from the field device, and the field controller is configured to send the datum to the data cache only if the datum is different than a previous datum sent to the data cache; and
    a second communication pathway coupling the field device and the data cache, the second communication having a bandwidth insufficient to carry the data acquisition system polls for data regarding the plurality of field parameters.

12. The system as defined in claim 11 wherein the data acquisition system is a supervisory control and data acquisition (SCADA) system.

13. The system as defined in claim 11 wherein the field controller polls the field device for the datum.

14. The system as defined in claim 11 wherein the field device is one selected from the group: a pressure transmitter; a flow transmitter; a level transmitter, position transmitter, or a temperature transmitter.

15. The system as defined in claim 14 wherein the datum read by the field controller is a status of the transmitter, and wherein the field controller is configured to send the status of the transmitter to the data cache only if the status of the transmitter changed from a previous status of the transmitter sent to the data cache.

16. The system as defined in claim 15 further comprising an asset management system coupled to the data cache, and wherein the asset management system is configured to obtain the status of the transmitter from the data cache.

17. The system as defined in claim 14 wherein the datum read by the field controller is a value of a field parameter, and wherein the field controller is configured to send the value of the field parameter to the data cache only if the value of the field parameter has changed by a predetermined amount from a previous value of the field parameter send to the data cache.

18. The system as defined in claim 14 wherein the datum read by the field controller is configuration information of the transmitter, and wherein the field controller is configured to send the configuration information to the data cache only if the configuration information has changed from previous configuration information sent to the data cache.

19. The system as defined in claim 18 further comprising an asset management system coupled to the data cache, and wherein the asset management system is configured to obtain the configuration information of the transmitter from the data cache.

20. The system as defined in claim 14 wherein the transmitter is Highway Addressable Remote Transducer (HART) communication protocol compliant.

21. A system comprising:
a plurality of field devices configured to measure field parameters to create measurement data;
a supervisory control and data acquisition (SCADA) system coupled to the plurality of field devices, wherein the SCADA system is configured to obtain the measurement data using a request and response format requiring above a predetermined bandwidth;
a data caching system coupled to the SCADA system by way of a first communication channel configured to have a bandwidth at least as great as the predetermined bandwidth, and the data caching system coupled to the plurality of field devices by way of second communication channel configured to have a bandwidth less than the predetermined bandwidth;
a field controller coupled to the data caching system by way of the second communication channel, and also coupled to the plurality of field devices;
said field controller is configured to obtain the measurement data from the plurality of field devices, and is configured to pass the measurement data to the data cache only if the measurement data has changed from previous measurement data;
said the data caching system is configured to cache the measurement data from the plurality of field devices and is configured to provide the measurement data to the SCADA system.

22. The system as defined in claim 21 wherein the field controller is configured to cache the measurement data.

23. The system as defined in claim 21 wherein the field controller is configured to obtain the measurement data by polling the plurality of field devices.

24. The system as defined in claim 21 further comprising:
an asset management system coupled to the data caching system by way of the first communication channel; and
said the data caching system is configured to obtain asset management data, and is configured to provide the asset management data to the asset management system.

25. The system as defined in claim 24 wherein the data caching system is configured to cache asset management data along with measurement data, and is configured to provide the asset management data to the asset management system.

26. The system as defined in claim 25 wherein the field controller is configured to read asset management data and is configured to send the asset management data to the data caching system only if the asset management data has changed from previous asset management data.

27. A system comprising:
a plurality of field devices configured to measure field parameters to create measurement data;
a data acquisition system, the data acquisition system is configured to obtain the measurement data using a request and response format;
a first caching system coupled to and proximate to the field devices, the first caching system configured to cache measurement data;
a second caching system coupled between the first caching system and the data acquisition system, the second caching system at a location remote from at least some of the field devices, and the second caching system is configured to cache measurement data provided by the first caching system only if the measurement data has changed from previous measurement data and further is configured to provide the measurement data to the data acquisition system upon request;
a first communication channel coupling the data acquisition system and the second data caching system, and wherein the bandwidth of the first communication channel is at least a great as a predetermined bandwidth for obtaining measurement data by the data acquisition system using the request and response format; and
a second communication channel coupling the second caching system to the field devices, and the bandwidth of the second communication channel is less than the predetermined bandwidth.

28. The system as defined in claim 27 wherein the second communication channel is configured to couple the first and second caching systems.

29. The system as defined in claim 27 wherein the first caching system is configured to obtain measurement data from the field devices using a request and response format.

30. A field controller comprising:
a processor;
a random access memory (RAM) coupled to the processor;
a first communication port coupled to the processor, the first communication port configured to communicate to field devices using a first communication protocol;
a second communication port coupled to the processor, the second communication port configured to communicate to a data cache system using a second communication protocol;
wherein the processor, executing a program, is configured to perform a process control loop and is configured to send commands to field control devices; and
wherein the processor, executing a program, is configured to receive data from the field devices over the first communication port, is configured to cache the data in the RAM, and is configured to send the data unsolicited to the data cache if the data has changed from previous data sent to the data cache.

31. The field controller as defined in claim 30 wherein the first communication port is configured to use a Highway Addressable Remote Transducer (HART) communication protocol.

32. The field controller as defined in claim 30 wherein the first communication port is configured to use a Foundation Fieldbus compliant communication protocol.

33. The field controller as defined in claim 30 wherein the processor, executing a program, is configured to receive status data for the field devices, and is configured to send the status data to the data cache over the second communication port if the status data has changed from previous status data.

34. The field controller as defined in claim 30 wherein the processor, executing a program, is configured to receive configuration data for the field devices, and is configured to send the configuration data to the data cache over the second communication port if the configuration data has changed from previous configuration data.

* * * * *